June 9, 1964 H. G. GEER ETAL 3,136,104
APPARATUS FOR MANUFACTURE OF CELLULOSIC PRODUCTS
Filed Aug. 21, 1961 8 Sheets-Sheet 1
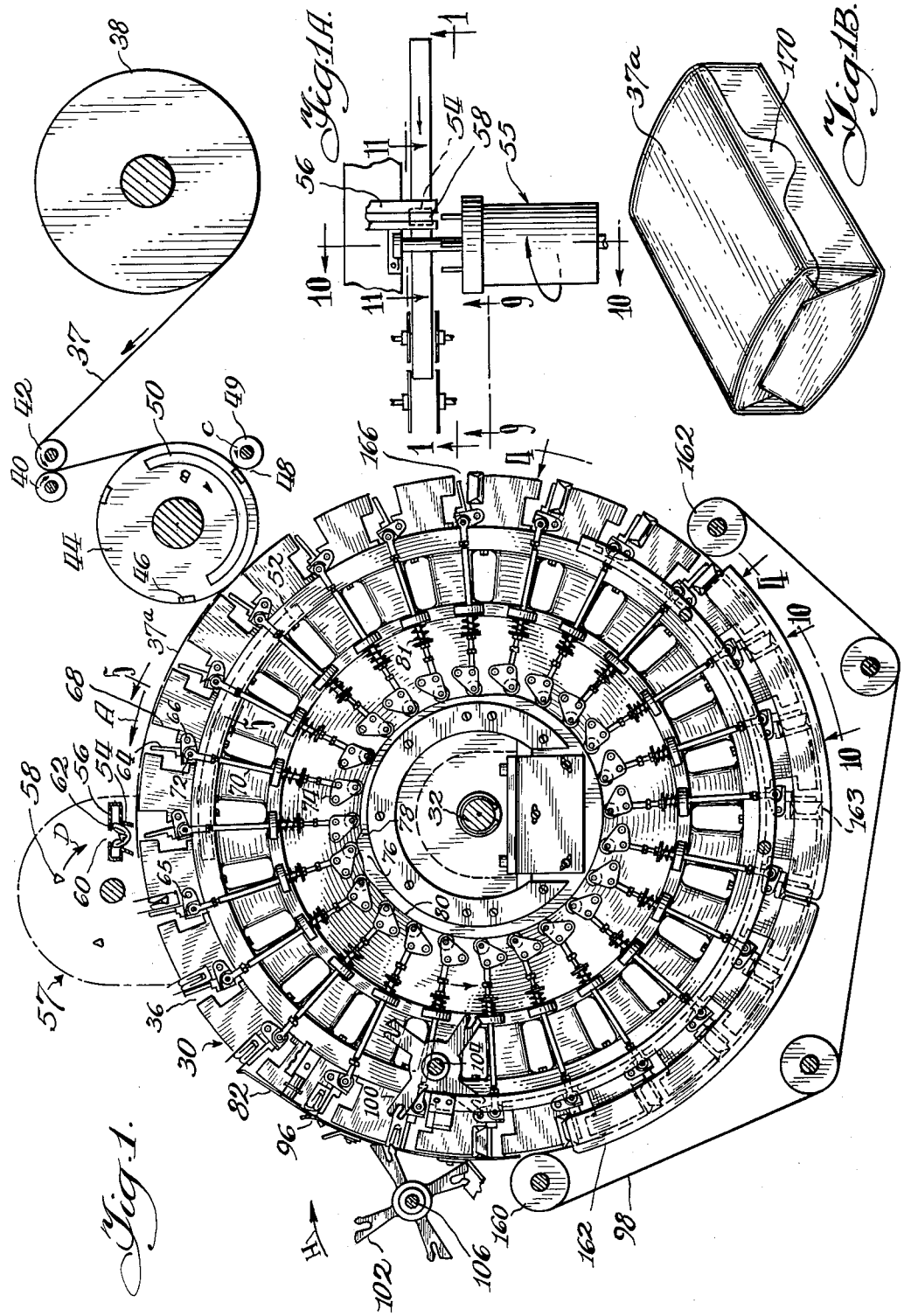

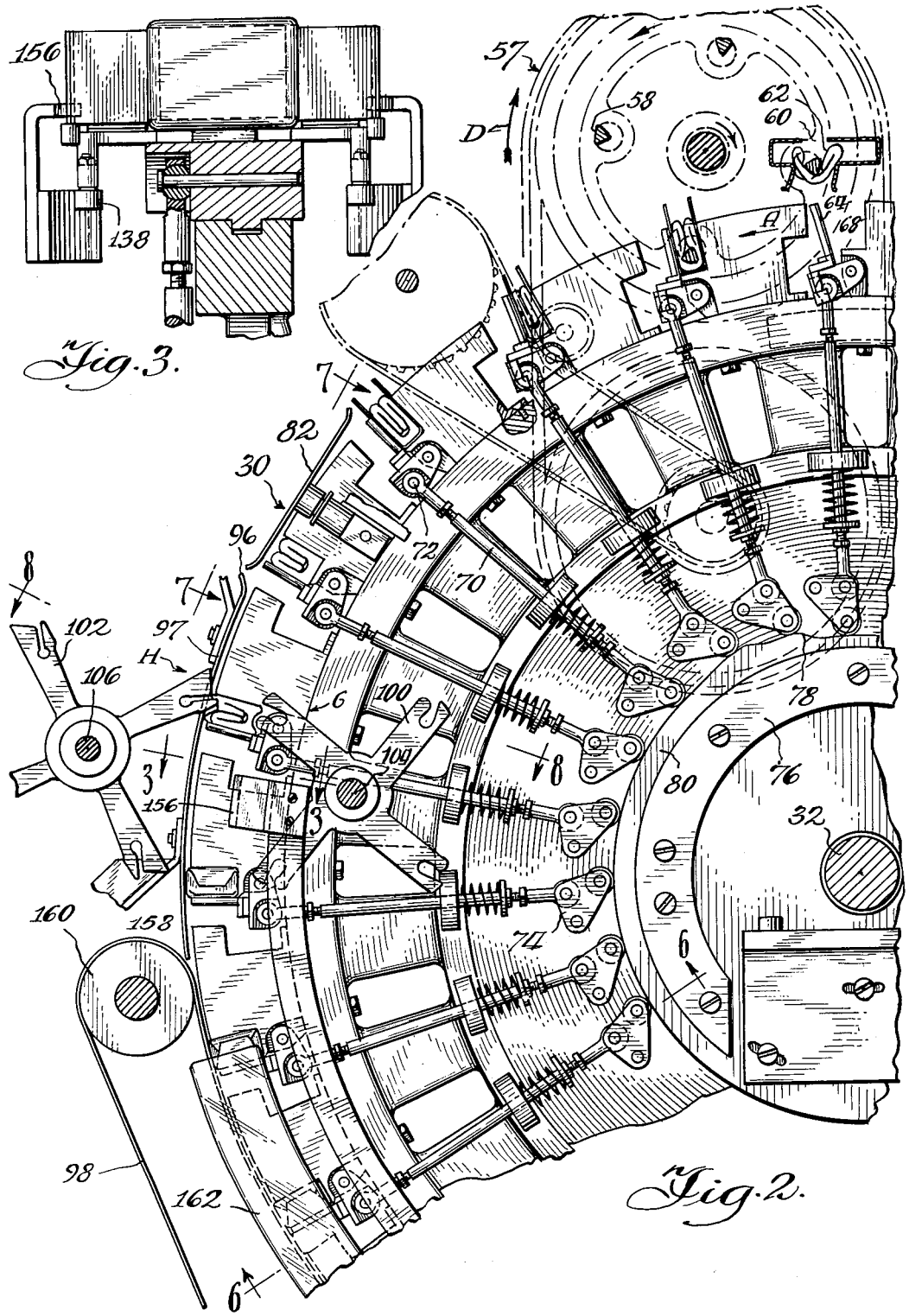

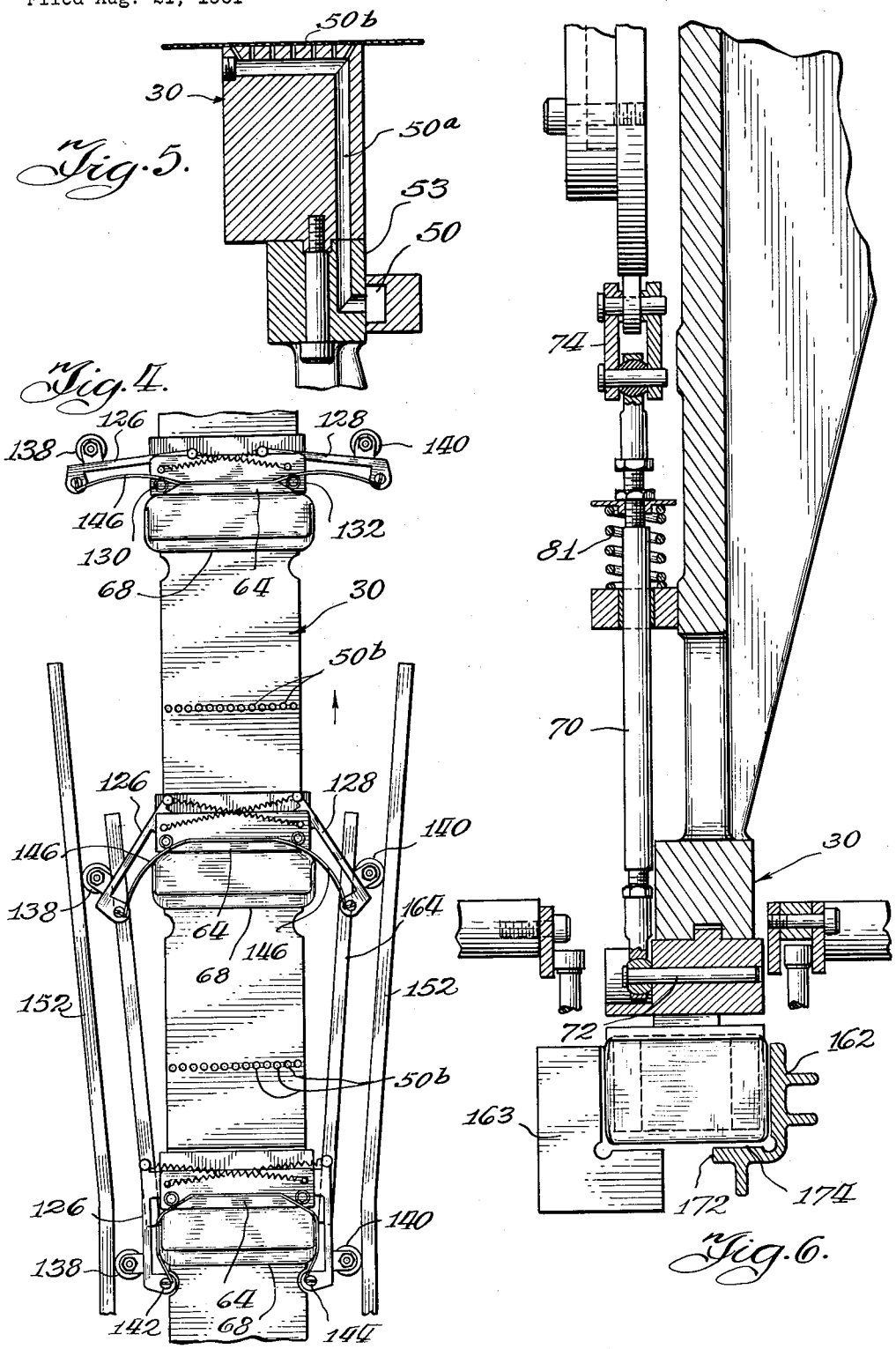

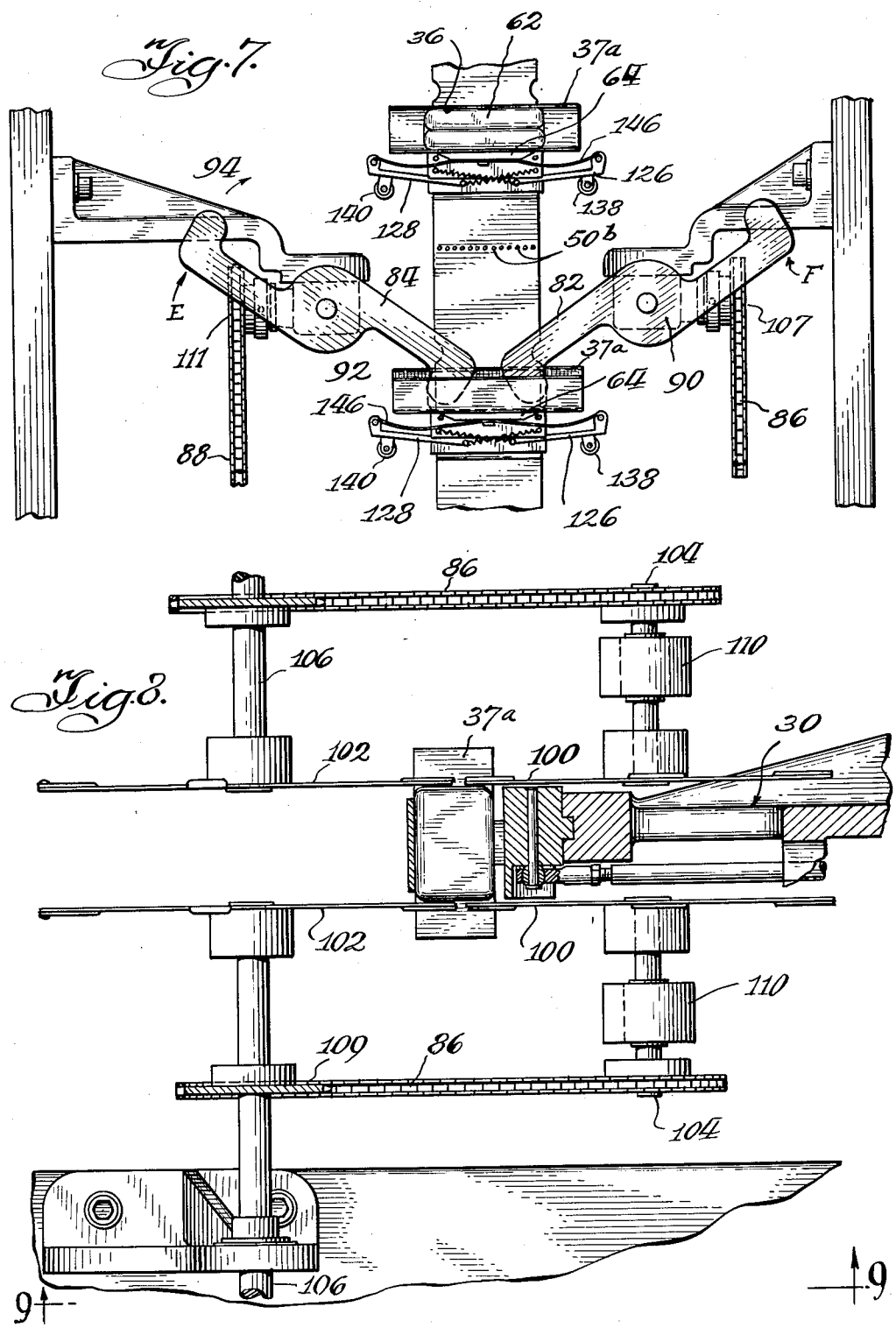

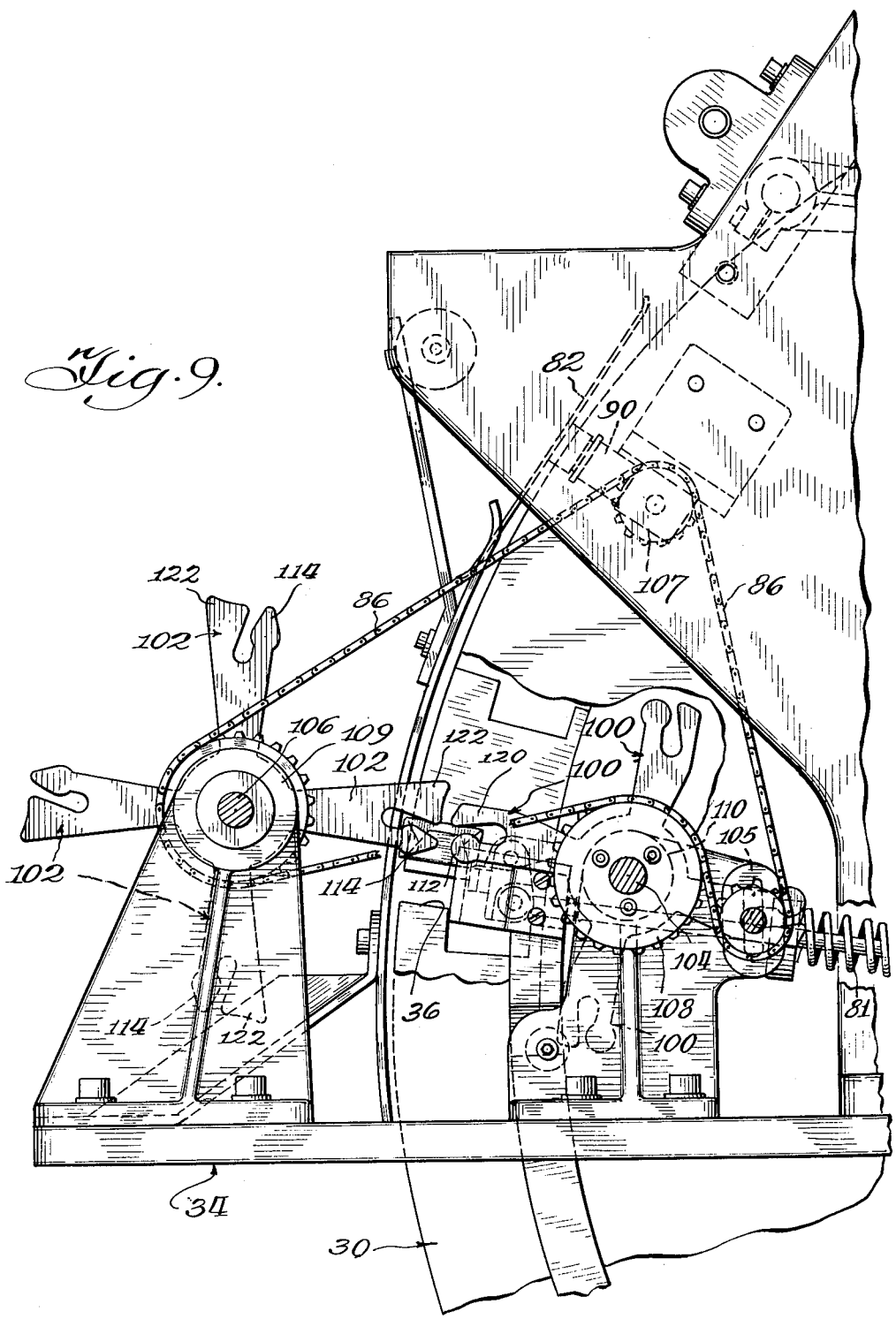

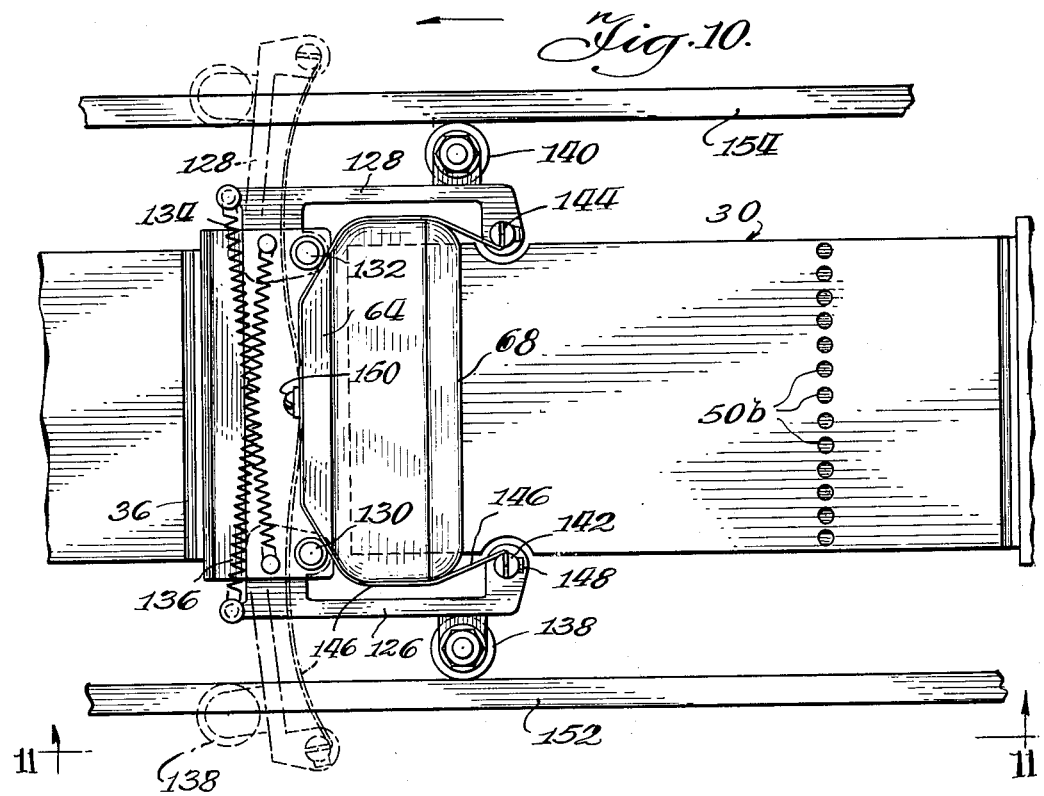
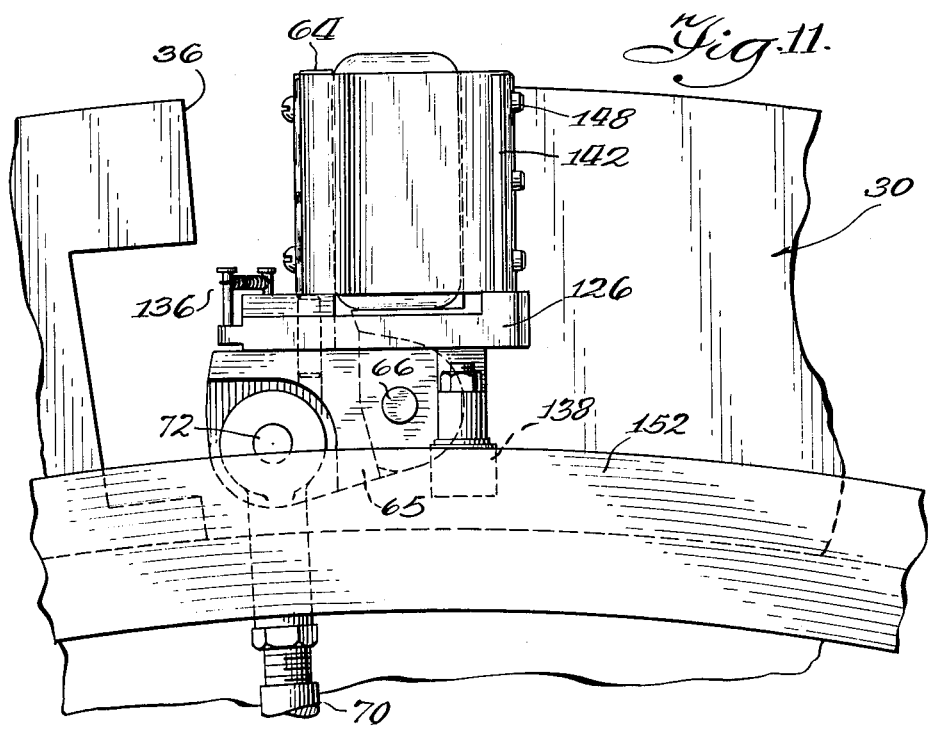

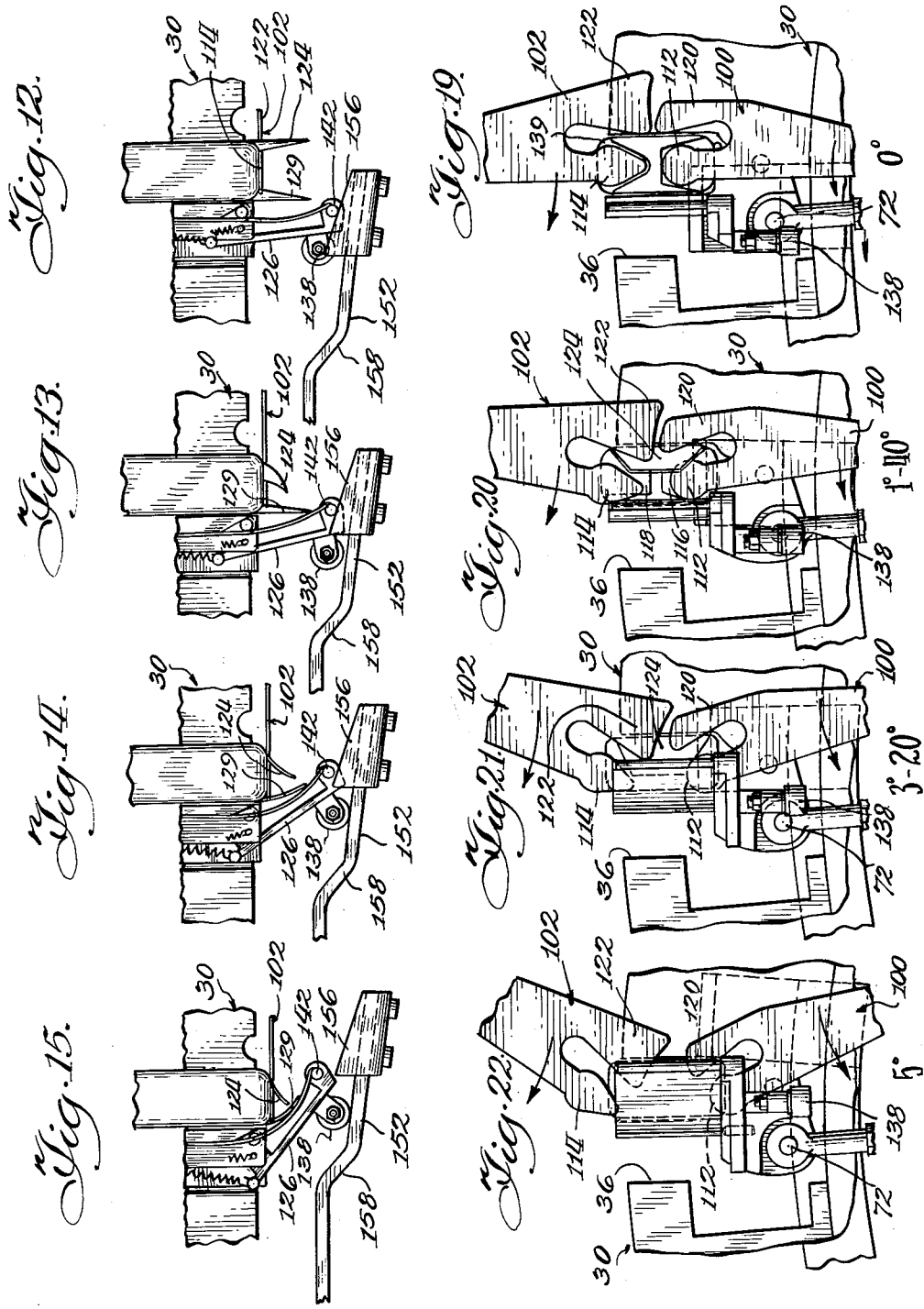

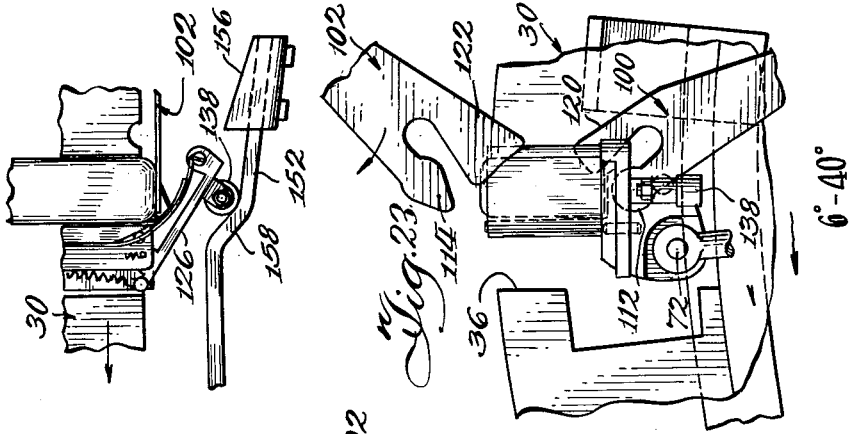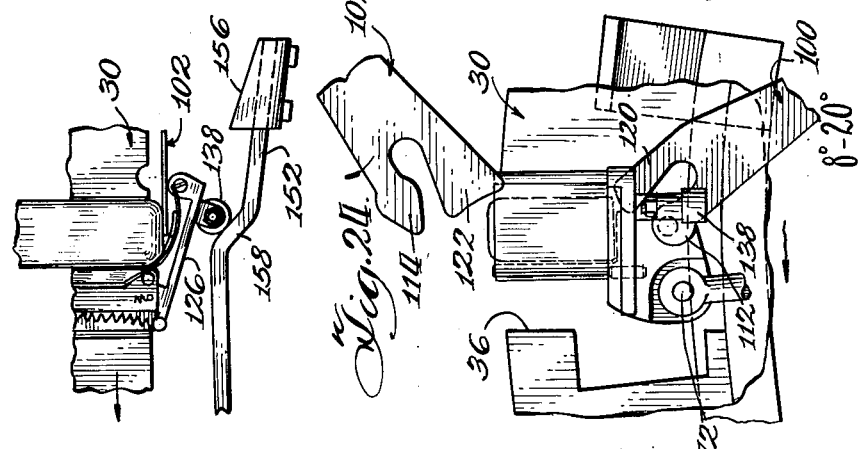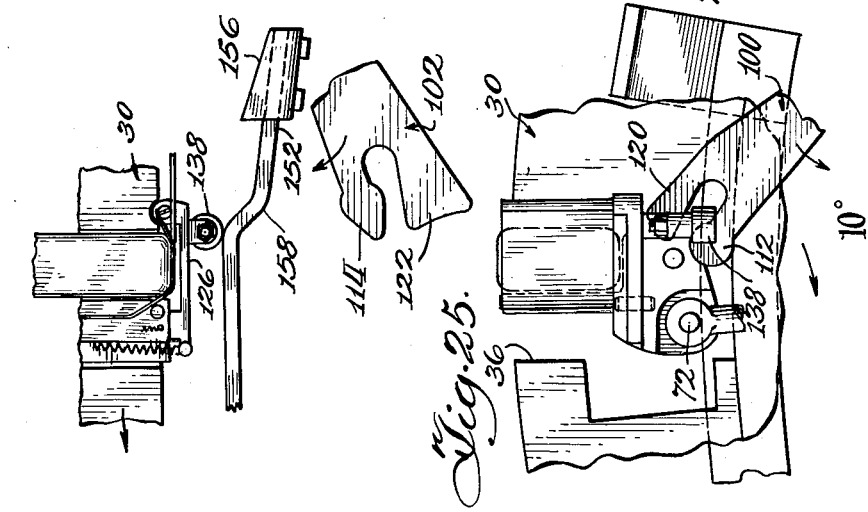

United States Patent Office 3,136,104
Patented June 9, 1964

3,136,104
APPARATUS FOR MANUFACTURE OF CELLULOSIC PRODUCTS
Henry G. Geer, Minneapolis, Minn., Charles J. Greiner, Menasha, Wis., and Robert Zuehlsdorff, Minneapolis, Minn., assignors to Kimberly-Clark Corporation, Neenah, Wis., a corporation of Delaware
Filed Aug. 21, 1961, Ser. No. 132,918
14 Claims. (Cl. 53—234)

This invention relates to improvements in packaging apparatus, with particular reference to continuous article packaging as the articles are conveyed at a uniform rate of movement past a sequence of work stations.

A primary object of the invention is to provide turret type packaging equipment adapted to receive folded articles such as sanitary napkins in a manner partially to enclose each article in a sheet-like wrapping material and thereafter to complete the wrapping and hermetically sealing of said material about each of said articles.

A further object is to provide an improved continuously rotating packaging apparatus adapted sequentially to receive C-folded sanitary napkins from a continuously operating folding mechanism, involutely to fold each napkin during transfer to a turret chamber.

A further object is to provide an improved packaging turret operative while continously rotating rather than by step-by-step movement to obtain an operative speed sufficient to receive and process sanitary napkins from the output end of modern high-speed production apparatus.

Other objects and advantages will become apparent to persons skilled in the art upon an examination of the drawings and description, the scope of the invention being defined in the appended claims.

In the drawings, in which like parts are identified by the same reference numeral:

FIG. 1 shows in side elevation a packaging turret incorporating the inventive concepts;

FIG. 1A illustrates in plan the turret of FIG. 1, including an article transfer mechanism, schematically illustrated; FIG. 1B shows an article, wrapped as herein taught;

FIG. 2 is an enlarged fragmentary elevational view of the device of FIG. 1;

FIG. 3 is an enlarged sectional view taken along line 3—3, FIG. 2;

FIG. 4 is a fragmentary end elevation along line 4—4, FIG. 1;

FIG. 5 is a section along line 5—5, FIG. 1;

FIG. 6 is a radial section along line 6—6, FIG. 2;

FIG. 7 is a fragmentary end view along line 7—7, FIG. 2;

FIG. 8 is a radial section along line 8—8, FIG. 2;

FIG. 9 is a fragmentary elevational view, partially in section, along line 9—9, FIG. 1a;

FIG. 10 is a bottom end view along line 10—10, FIG. 1;

FIG. 11 is a fragmentary elevation along line 11—11, FIG. 10;

FIGS. 12–18 progressively illustrate the operative sequence of a cam actuated infolding mechanism of FIGS. 10 and 11 during rotation of the turret of FIG. 1 through a pre-determined path; and FIGS. 19–25 illustrate positions of two pairs of side tuckers corresponding to the cam position shown in FIGS. 12–18.

As best shown in FIGS. 1 and 2, a packaging turret, generically designated 30, is suitably mounted on an axis 32 and continuously driven, by means not shown, at a uniform speed in a counter-clockwise direction as indicated by arrow A. Turret 30 and the associated structure described herein are supported on suitable framework, fragmentarily shown generically designated 34 in FIG. 9. Since details of the framework form no part of the invention, both the turret per se and the mounting structure being known in the art, framework 34 will be mentioned only as required in respect to associated components involving inventive concepts.

Turret 30 is circumferentially provided with a plurality of outwardly open article receiving pockets or chambers 36, twenty-four such pockets being shown in turret 30. During continuous counter-clockwise rotation of turret 30 film-like sheet stock 37, such as polyethylene film, is continuously fed from a supply roll 38 between a pair of counter-rotating pull rolls 40—42 and partially around the periphery of a cutter roll 44 provided with hardened inserts 46 equally spaced circumferentially for registry with a knife 48 which radially extends from a knife roll 49. Cutter roll 44 rotates clockwise as shown by arrow B as knife roll 49 rotates counter-clockwise, arrow C, for severance of sheet stock 37 into individual panels 37a which are sequentially deposited peripherally of turret 30 in bridging relation to each pocket 36 thereof.

Film 37 both prior to and after being cut into panels 37a, is snugly maintained peripherally of roll 44 by vacuum means associated with manifold 50. Each cut panel 37a, after transfer from the periphery of roll 44 to the periphery of turret 30, is also maintained in snug engagement therewith by vacuum means associated with a fixed manifold 52. As shown in FIG. 5, a fixed manifold 52 is maintained in close bearing engagement with turret surface 53, turret 30 being provided, intermediate the pockets thereof, with a suitable number of radial channels 50a each of which communicates with a plurality of surface bores 50b to provide the vacuum required to hold cut panel 37a snugly against the turret surface with manifold 52 connected to a vacuum source. The surface of cutter roll 44 is provided with similar vacuum ports, further details being omitted since the vacuum producing structure is known and not claimed herein as inventive per se.

Panels 37a, each bridging a turret pocket 36, move outwardly of roll 44 and underneath an article dispensing throat 54 which depends obliquely from a rectangular feed trough 56 forming the discharge end for a high-speed folding mechanism such as is disclosed in applicants' concurrently filed application Serial No. 132,818, now Patent No. 3,116,920.

As each panel 37a moves under trough 54, transfer mechanism generically designated 57, FIGS. 1 and 2, preferably of the type disclosed in another of applicants' co-pending applications, Serial No. 132,947, now Patent No. 3,116,921, effects transfer of articles from trough 56 through dispensing throat 54 and into pockets 36. Mechanism 57 includes four circumferentially spaced and axially retractable fingers 58, driven to rotate in a clockwise direction as shown by arrow D, FIGS. 1 and 2, fingers 58 passing downwardly through opening 60 in the upper wall of trough 56 to contact the central portion of a C-folded sanitary napkin 62 positioned directly above and in bridging relationship to trough 54. Continued movement of finger 58 forces napkin 62 through trough 54 as the folded ends thereof are drawn upwardly by constriction of trough 54 to assume an involute configuration prior to being forced downwardly into turret pocket 36. As best shown in FIG. 2, trough 54 is positioned obliquely to a tangent to the turret 30, delivery of involutely folded napkins 62 into pocket 36 being completed at a position beyond the center of trough 56 in the direction of turret rotation.

Each pocket 36 is provided with a pivotally mounted planar element 64 which serves as the forward pocket wall. Element 64 as shown in FIGS. 2, 3, 10, and 11, is supported on a mounting bracket 65, pivotal about pintle 66, for cam actuated movement between positions of outward divergence and outward convergence. Bracket 65 also carries laterally pivotable cam controlled outrigger arms as later described. Bracket 65 and element 64, fixed thereto, are cammed to pivot in respect to a fixed trailing chamber wall 68 by radially disposed rods 70. As shown in FIGS. 1 and 2, each element 64 assumes an outwardly divergent or open position prior to passage of a pocket underneath trough 56 to receive an article. Shortly thereafter, element 64 is pivoted to a closed or outwardly convergent position to subject the deposited article to a substantial degree of compression. Element 64 is thereafter returned to parallel spaced relation in respect to fixed trailing wall 68. The outer ends of rod 70 are pivotally attached to bracket 65 at 72, at a position eccentrically of pintle 66. The inner ends of rod 70 are provided with cam follower fixtures 74 for radial rod actuation as the followers ride along fixed cam 76 about which turret 30 rotates. The above described pivotal movement of each element 64 during its path of movement in the area of transfer mechanism 57 is effected by fixture 74 riding upwardly on cam 76 in an area shown at 78 to move rod 70 radially outwardly with resulting movement of element 64 from an open to closed position. With continued turret rotation, cam fixture 74 descends from the raised cam area 78 to a lower cylindrical cam portion 80 as rod 70 returns under the bias of compression spring 81 to return element 64 into substantially parallel spaced relation to pocket wall 68.

Since each pocket 36 is bridged by an individual film panel 37a prior to receiving an involutely folded article, article transfer into pocket 36 causes panel 37a to be drawn down into the pocket and to enclose the sides and bottom of the article in a generally U-configuration with opposite end portions of the panels projected radially outwardly of the ends of the article and outwardly of turret 30. Since panel 37a is of a width substantially greater than the article pocket widths, portions of panel 37a extend laterally beyond turret 30 at each side thereof. As turret 30 continues to rotate, the leading tab end of panel 37a moves into the operative area of a pair of rotatably mounted elongate side tucker blades 82 and 84, as best shown in FIGS. 1, 2, 7, and 9. Blades 82 and 84 are driven in counter-rotation in a plane tangentially of the turret path about axes positioned on opposite sides of the turret. Blades 82 and 84 are driven by chains 86 and 88 in a known manner from a common power source, through suitable gear reduction devices 90 and 92. Each tucker blade is provided with a pair of laterally arced terminal portions 94 disposed at 180 degrees angularity.

As best shown in FIG. 7, the side tucker blades are driven in counter-rotation as shown by arrows E and F, their rotation being synchronized to allow unrestricted passage therebetween of the leading tab end of each panel 37a. The tucker blades thereafter move inwardly of the path of turret 30 to engage the trailing tab end of each panel 37a from the rear thereof to effect downward tab folding against the exposed outer article wall. The rotational speed of blades 82, 84 is synchronized with the turret speed to permit the blade portions, after downfolding of the trailing tab, to move outwardly of the turret path prior to the entry of the leading tab portion under an outwardly arced portion 96 of a guard-like ramp 97 for downfolding of the leading tab portion against the previously down-folded trailing tab.

Ramp 97 is spaced outwardly of and extends circumferentially along turret 30 from a position adjacent the exit end of the operating area of side tucker blades 82, 84 to a position adjacent a continuously moving heated sealing belt 98, later described. As an article passes under the upturned end 96 of ramp 97 encirclement of panel 37a about an article is completed to an extent that the article is then enclosed in a tubular wrapper with the ends of the tubular panel material extending laterally from opposite sides of the turret pocket. The apparatus next described effects neat end folding of the open tubular ends of the panel material during article travel underneath guard 97 but prior to passage underneath sealing belt 98.

As shown in elevation in FIGS. 1 and 2, and in plan in FIG. 8, two pairs of counter-rotating four-bladed end tuckers, the blades of each pair being numbered 100 and 102, are mounted on shafts 104 and 106 with pairs driven in counter-rotation as shown by arrows G and H. Shafts 104 and 106 are operatively connected by sprockets 108 and 109 and chains 86 and 88, the chains being driven from shaft 106 and engaging the sprocket of shaft 104 for counter rotation thereof and over idler 105, and about sprockets 107 and 111, respectively, of gear boxes 90 and 92 which rotate side tucker blades 82, 84 as shown in FIG. 7.

As each turret pocket 36 enters the operating area of the end tuckers 100 and 102, the laterally extending tubular portions of the wrapper material are subjected first to in-tucking in a radial direction with resultant formation of leading and trailing tabs and thereafter to tucking of a resulting trailing tab over the in-tucked portions as shown schematically in FIGS. 19–25. Tucker blades 100, 102 rotate through vertical planes closely spaced laterally of turret 30. As articles move into the operating area, the end tucker blades contact the tubular end portions of each panel 37a which extend laterally of the blades as shown in rectangular outline, FIG. 8. As tuckers 100 and 102 rotate toward a partially wrapped article in the arrow direction of FIG. 19, thumb-like blade portions 112 and 114 on each of the individual blades 100 and 102 force the film outwardly of the inner wall of the article and inwardly of the outer wall of the article to provide a pair of radial aligned tucks as shown at 116, 118, respectively, FIG. 20. After completion of tucks 116, 118, spaced trailing blade portions 120 and 122 move inwardly of the pocket area to fold down a resulting trailing tab 124, FIG. 20.

As best shown in FIGS. 12–18, down-folding of the leading tab at opposite ends 129 of the wrapper is effected by a cam actuated in-folding device, the construction of which is best shown in FIGS. 10 and 11. A pair of outrigger arms 126, 128 are attached to bracket 65 by pintles 130, 132 for cam actuated pivotal movement between laterally extended dotted line positions shown in FIG. 10 as biased by a pair of suitably attached tension springs 134, 136 and the full line position shown. The free ends of arms 126, 128 carry upstanding channeled rods 142, 144 to which opposite ends of a flexible tape or belt 146 are secured by cap screws 148. Belt 146 is preferably of Teflon or other suitable heat-resistant material of superior release characteristics, the central portion thereof being attached to the back surface of element 64 by screws 150. Cam rollers 138, 140 depend from arms 126, 128 as shown in FIG. 11 for registered engagement with the inner surface of circumferentially extending and laterally positioned cam tracks 152, 154.

FIGS. 12–18 sequentially illustrate the cam actuated movement of outrigger arm 126 (arm 128 being actuated in a like manner) during movement of its associated turret pocket from the operative area of side tuckers 100, 102 to a position forward of that area. As shown in FIG. 12, tabs 116, 118 have been radially disposed inwardly at each end of the tubular wrapper as shown in FIG. 19, and at that folding stage rod 142 of arm 126 rides upwardly of a cam ramp 156 positioned above and radially outwardly of cam roller 138, as best shown in FIG. 3. The circumferential position of ramp 156 in respect to the turret path is shown in FIG. 2. As in FIG. 20, trailing tucker blade portions 120, 122 have started to downfold trailing tab 124 as rod 142 continues to ride up ramp 156 toward the apex position shown in FIG. 13 to bring follower roll 138 into engagement with cam track 152, FIG. 14, with further pivoting of arm 126 and disengagement of rod 142 from ramp 156 as in FIG. 15. The corresponding movement of tucker arms 100, 102 are illustrated in FIGS. 19-22. Track 152 includes a steeply inclined area 158 for the accentuation of the counterclockwise pivoting of arm 126 as roller 138 arrives at the position shown in FIG. 16 and moves to the position of FIG. 18. FIGS. 23 and 24 illustrate the corresponding movement of tucker arms 100, 102 during the final stage of downfolding of trailing tab 124, as shown completed in FIG. 18, wherein completion of the travel of roller 138 up ramp 158 has pivoted arm 126 to a position aligned with the plane of turret 30 to draw the end of belt 146 tightly around the folded tabs at the package end. As shown in FIGS. 23-25, end tucker blades 100, 102 move in counter-rotation away from the wrapped article and repeat their rotational sequence as they again move into the wrapper engaging position of FIG. 2 as a fourth trailing article moves into the operating area of the side tuckers.

The package material is now completely wrapped about the article. The over-folded side tabs enclosing the outer wall thereof are maintained in contacting engagement by circumferentially extending constraining guard 97 during article passage through and beyond the operative area of side tuckers 100, 102. Teflon belt 146 maintains the folded end tabs snugly engaged as the article moves away from the end tuckers. Guard 97 terminates at 158 adjacent a guide pulley 160 over which an endless sealing belt 98 passes in a clockwise direction, FIG. 2, at which position the wrapped article passes under belt 98 which continues to maintain the folded side tabs compressed. The speed of belt 98, which is of Teflon or similar material which releases readily from the wrapper material after sealing, is synchronized with the peripheral speed of turret 30 simultaneously to apply pressure without slipping and sufficient heat to the folded side tabs to effect thermal fusion thereof. As above mentioned, panel 37a consists of polyethylene film or other film which is rendered sufficiently thermoplastic by heated belt 98 to effect a heat seal. Shortly after the folded side tabs of the article pass below belt 98, belt 146, enclosing the folded end tabs, moves into contacting engagement with a circumferentially extending heater member 162 closely spaced laterally of the turret. Heater 162 transfers sufficient heat to the wrapper enclosing portion of Teflon belt 146 to insure sufficient conduction therethrough rapidly to effect interbonding of the folded tabs.

As shown in FIG. 1, heater 162, one side of which is shown in partial cross section, FIG. 6, may extend through a circumferential arc of thirty or more degrees and may be heated by electrical elements or otherwise. As the packaged article completes its travel intermediate members 162 it enters a cooling zone 163, one of which is also shown in FIG. 6, which may be water cooled or refrigerated in a known manner. The overlapped tabs of the article which have been fused together during passage between heater members 162 but which are in a tacky condition during passage from the leading end of members 162 are firmly set during passage between cooling members 163. Belt 98, in its path between pulleys 160 and 162, travels through the circumferential arcs of both pairs of heating and cooling elements 162 and 163 respectively. The optimum arcs of the heating and cooling members is a function of the characteristics of the wrapper material and the respective temperatures at which the heating and cooling members are maintained. While heat radiated by member 162 normally serves to maintain belt 98 at an effective sealing temperature, a separate belt heater, not shown, may be employed if required. Since heat transfer through belt 98 is rapid, a single belt is employed for maintenance of the overlapped side tabs during passage through both the heating and cooling zones. Heat transferred through belt 98 from members 162 is rapidly extracted from the fused wrapping material during belt passage through the cooling zone. Such a belt may be of fiberglass, with a Teflon surface, and may be of a thickness in the range of .005″ thick.

As shown in FIG. 4, as each article leaves the cooling zone, cam tracks 152 diverge outwardly and ultimately terminate at about the second article position counter clockwise of pulley 162, FIG. 1. Follower pulleys 138 gradually move outwardly of turret 30 in their travel along the divergent cam portions under the urge of tension springs 134, 136 to pivot outrigger arms 126, 128 ultimately to their fully extended position, hence unwrap belt 146 from opposite ends of the article as shown at the top of FIG. 4. Supplemental cam tracks 164, inwardly of and in parallel spaced relation to the divergent portions of tracks 152, provide a closed cam follower track to insure positive removal of belt 146 from the article ends, since the tension of springs 134, 136 might prove insufficient for that purpose.

Cam tracks 164 may terminate short of the divergent portion of tracks 152, since springs 134, 136 insure complete lateral pivoting of arms 126, 128 after contact between belt 146 and the wrapper ends is broken.

As the packaged articles, with wrappers heat sealed, leave the operative area of cooling members 163 and belt 98, the wrapper film material is also air cooled as the turret continues its rotation upwardly toward an ejector mechanism positioned at station 166, but not shown, since such devices are well known. One such ejector device consists of a horizontally rotatable spoked hub, the spokes of which pass transversely through each turret pocket while moving past station 166 to eject laterally the wrapped article from the pocket. As shown in FIG. 1, pivotal element 64 defining the front wall of each pocket remained in spaced parallel relation to its fixed trailing pocket wall 68 during travel from a position prior to passage into the operating area of tucker blades 82, 84 to a position just short of arrival at ejector station 166. Cam follower 74 was thus engaged with a uniform radius portion of fixed cam 76, but as the pocket approached ejector station 166, its associated cam follower 74 moved downwardly on cam 76 under the urge of spring 81 to a cam portion of reduced radius with resultant pivoting of element 64 to an outwardly divergent position to permit easy removal of the article at the ejector station 166. Element 64 thereafter remains in an open position as follower 74 continues to move over the reduced radial portion of cam 76, and upon arrival at the previously mentioned upwardly contoured cam area 78 the cycle is repeated.

The movement of member 64 from an outwardly divergent position to facilitate article deposit therein to an outwardly convergent position rather than merely returning to parallelism with trailing wall 68 effects a degree of article compression which improves the rectilinear configuration of the article as finally packaged. As best shown in FIGS. 2 and 19-25, the side tucker blades 100 and 102 are of somewhat different configuration. The thumb portion 112 of blade 100 terminates in a portion semicircular in plan, while the corresponding thumb portion 114 of blade 102 is somewhat longer than thumb portion 112 and terminates in a converging tip extending outwardly of the corresponding portion 112 of blade 100. Those differences in blade configuration compensate for the fact that turret 30, hence the article being wrapped, moves past blades 100 and 102 in a circular rather than in a linear path. Hence the time of wrapper contact of blade 100 in respect to its function of first infolding and then overfolding lateral portions of panel 37A would be longer than the time of contact of blade 102, assuming blades of like configuration. Extension of thumb portion 114 of blade 102 equalizes the time of blade contact with the wrapper material. A corresponding correction in respect to the trailing portions of the blades is effected by widened portion 122 of blade 102 in respect to portion 120 of blade 100 during downfolding of tab 124.

Employment of the concepts herein taught as above described for the packaging of sanitary napkins in generally rectangular configuration results in the neatly packaged article shown in FIG. 1B, the wrapper material 37a being snugly maintained thereabout by tension imposed by the enclosed article as packaged under some compression. If desired, a tear tab 170 may be formed by providing cutter blade 48 with centrally arced portion. Since the tab is not sealed to adjacent wrapper portions it is conveyed by belt 98 through a heater zone channel defined between inner wall portions 172 of elements 162, as belt 98, disposed in space 174, but not shown, moves at the turret speed while engaging the radially outer walls of element 162. Belt 98 thus applies sufficient heat to fuse the overlapped side margins of the package shown in FIG. 1B laterally of tear tab 170 without sealing tab portion 170 to the package side wall.

We claim:

1. The combination with a rotatably driven packaging turret provided with a plurality of circumferentially spaced outwardly open article receiving pockets and means for the rotation of said turret at a constant speed, of a pivotably mounted element disposed in each of said pockets for movement between outwardly divergent and outwardly convergent positions while providing a leading pocket wall, cam means synchronized with the rotation of said turret for pivotal actuation of said elements during movement through portions of the turret path, means for the sequential transfer of articles into said pockets while said elements are in a divergent position, said cam means thereafter pivoting said element to said convergent position and then to a position intermediate said convergent and divergent positions.

2. In a multiply-pocketed and continuously rotated packaging turret, means for sequentially feeding compressible articles and a partially encircling wrapper panel into the turret sockets, means associated with said pockets for compressing said pocketed articles and thereafter relieving some of the compression causing forces, means comprising a pair of side tucker blades driven in counter-rotation in a common plane tangential to the path of turret rotation and a fixed folding element for completing encirclement of the wrapper panel about said article in tubular from with portions overlapped to form an overlap, means comprising a pair of end tucker blades driven in like rotation in planes normal to the plane of rotation of said side tucker blades and a second fixed folding element for in tucking and overfolding of end portions of said tubular panel, means for maintaining said panel overlap and said end tucked and overlapped panel portions in pressure engagement, and means for applying sufficient heat to effect interbonding thereof.

3. The device of claim 2, wherein said means for maintaining said first mentioned overlapped portions in pressure engagement during heat application comprises a circumferentially extending fixed element spaced outwardly of the path of the turret periphery.

4. The device of claim 2 wherein said means for maintaining the end tucked on overlapped panel portions in pressure engagement during heat application comprises a belt-like wrapper element mounted to extend transversely through each pocket with portions thereof extending laterally of the turret prior to the end tucking operation, and associated cam controlled mechanism for inwardly wrapping the laterally extending portions of said belt snugly against said end tucked and second mentioned overlapped panel portions.

5. In a pocketed packaging turret, the subcombination comprising a pivotably mounted element forming a forward pocket wall, cam means actuated by turret rotation to pivot said element between outwardly divergent and an outwardly convergent position in respect to a fixed radially positioned trailing pocket wall, a pair of arms pivoted to said element for movement from laterally extending positions in respect to said turret to positions adjacent the turret side walls, cam means for the pivoting of said arms between said positions, and a belt-like element mounted between said arms, said laterally extending belt portions being wrapped against the ends of a pocketed and wrapped article by the camming of said arms from laterally extending positions to positions adjacent the turret side walls.

6. The combination with a multiply-pocketed packaging turret rotatably driven past an article loading station for the individual deposit of articles into the pockets thereof, means spaced circumferentially from the loading station in a direction counter to that of turret movement for applying panels of sheet-like wrapping material to the peripheral surface of said turret with portions of said panels extending laterally from opposite sides of the turret and each panel bridging a pocket thereof during turret movement from said panel applying means to the loading station, vacuum means intermediate said panel applying means and loading stations to maintain the wrapper material in snug peripheral engagement with the turret, means spaced from said loading station in the direction of turret rotation to downfold panel portions maintained radially outwardly of the turret by a pocketed article, means spaced in a like direction from said downfolding means to effect two overlapping sets of tabs in resulting tubular panel portions extending laterally of the turret, said last mentioned means comprising two pairs of end tucker blades mounted for counter rotation in planes in close parallel spaced relation to each side of the turret, said end tucker blades including leading portions adapted to provide radially disposed tucks and trailing portions adapted to provide downfolding of resultant trailing panel portions against said radially disposed tucks, means for downfolding resultant leading laterally extending panel portions to complete endfolding, means for maintaining said folded panel portions in pressure engagement during further turret movement, and means for conducting sufficient heat to said pressure engaged folded portions to effect bonding thereof.

7. The apparatus of claim 6 including pivotably mounted leading walls and fixed trailing walls defining said pockets, cam means for pivoting said leading walls first to an outwardly divergent position prior to movement past said loading station, secondly to an outwardly convergent position following article deposit therein and thirdly to a position substantially radially of said turret.

8. In a device of the character described, an outwardly open pocket defined between a pivotably mounted leading wall and a fixed and substantially radially disposed trailing wall, a bracket pivotably attached to the turret adjacent said pocket, means for pivoting said bracket during the rotation of said turret, a wall-forming element disposed transversely of said chamber and fixed to said bracket to be pivoted thereby between positions of outward divergence and outward convergence in respect to said trailing wall, a pair of outrigger arms pivoted to said wall-forming element and positioned at opposite sides of said turret for movement between positions outwardly extending in respect to the turret side walls and adjacent thereto, and means for pivoting said outrigger arms between said positions including a cam follower fixed to each said arm and a fixed cam track extending circumferentially in spaced relation along opposite sides of the turret in positions for contact by said followers.

9. The combination with a rotatable packaging turret having circumferential pockets containing articles enclosed therein by a sheet-like wrapper panel with panel portions extending both radially from leading and trailing pocket walls and laterally from each side of the pocketed articles; of a pair of side tucker blades driven in counter rotation in a plane tangentially of and closely adjacent the turret periphery and synchronized with the turret rotation to downfold said radially extending trailing panel portion as a pocketed article moves through the plane of rotation of said tuckers, fixed means at a position leading the paths of said tucker blades and closely adjacent the turret periphery for downfolding the leading panel portion over the previously downfolded trailing portion, a pair of bifurcated end tucker blades driven in the direction of turret rotation in a plane in close parallel spaced relation to a side of the turret with the blades synchronized to press from a laterally extending panel portion against the end of a pocketed article, a pair of radially disposed tabs and an overlapping trailing tab, and means for downfolding a resulting leading tab against said previously downfolded and overlapped tabs.

10. Apparatus for wrapping a plurality of compressible articles comprising a rotatably driven turret provided with a plurality of article receiving pockets, means for delivering panels of flexible wrapping material in sheet form to the peripheral surface of the turret with each panel maintained bridged across a pocket with leading and trailing portions thereof extending peripherally outwardly of the pockets and panel portions extending laterally of the turret, means for sequentially depositing articles into the pockets while drawing a major panel portion therewith about the article with leading and trailing portions positioned to extend radially outwardly of the turret, means for downfolding the trailing panel portion against the exposed outermost article surface, means for downfolding the leading panel portion in overlapped relation against the folded trailing portion, means for infolding, while said partially wrapped article is maintained in a turret pocket, the resultant laterally extending tubular panel portions to form a pair of radially disposed tabs intermediate resultant leading and trailing non-folded laterally extending tabs, and means for downfolding the trailing lateral tabs against the radially disposed tabs comprising a pair of tucker blades driven in counter rotation in a plane tangentially of the turret periphery and so synchronized with the turret speed as to engage and downfold the trailing tab from the rear thereof as the pocketed article moves through the operating area of said tucker blades.

11. Apparatus for wrapping a plurality of compressible articles comprising a rotatably driven turret provided with a plurality of article receiving pockets, means for delivering panels of flexible wrapping material in sheet form to the peripheral surface of the turret with each panel maintained bridged across a pocket with leading and trailing portions thereof extending peripherally outwardly of the pockets and panel portions extending laterally of the turret, means for sequentially depositing articles into the pockets while drawing a major panel portion therewith about the article with leading and trailing portions positioned to extend radially outwardly of the turret, means for downfolding the trailing panel portion against the exposed outermost article surface, means for downfolding the leading panel portion in overlapped relation against the folded trailing portion, means for infolding, while said partially wrapped article is maintained in a turret pocket, the resultant laterally extending tubular panel portions to form a pair of radially disposed tabs intermediate resultant leading and trailing non-folded laterally extending tabs, and means for downfolding the trailing lateral tabs against the radially disposed tabs, and means for thereafter downfolding the leading lateral tabs against the downfolded trailing tabs comprising a fixed folding guard extending circumferentially in closely spaced relation to the turret, said guard being provided with an outwardly arced end portion defining with the turret periphery an entry channel converging in the direction of turret rotation.

12. Apparatus for wrapping a plurality of compressible articles comprising a rotatably driven turret provided with a plurality of article receiving pockets, means for delivering panels of flexible wrapping material in sheet form to the peripheral surface of the turret with each panel maintained bridged across a pocket with leading and trailing portions thereof extending peripherally outwardly of the pockets and panel portions extending laterally of the turret, means for sequentially depositing articles into the pockets while drawing a major panel portion therewith about the article with leading and trailing portions positioned to extend radially outwardly of the turret, means for downfolding the trailing panel portion against the exposed outermost article surface, means for downfolding the leading panel portion in overlapped relation against the folded trailing portion, means for infolding, while said partially wrapped article is maintained in a turret pocket, the resultant laterally extending tubular panel portions to form a pair of radially disposed tabs intermediate resultant leading and trailing non-folded laterally extending tabs, means for downfolding the trailing lateral tabs against the radially disposed tabs comprising a pair of end tucker blades rotatably driven in like direction through planes closely spaced adjacent the turret side walls, and means for thereafter downfolding the leading lateral tabs against the downfolded trailing tabs.

13. The device of claim 12 wherein said end tucker blades each includes a leading thumb-like portion positioned to form radially disposed tabs, and trailing portions spaced therefrom adapted to downfold a resulting trailing tab portion against the previously formed radially disposed tab portions.

14. In a device of the character described, the subcombination comprising a turret provided with peripherally open pockets of a circumferential width substantially greater than the article to be deposited therein, a leading wall-like member disposed in each of said pockets and mounted to pivot between a position of outward divergence and outward convergence in respect to fixed and substantially radially disposed trailing pocket walls, cam actuated means operative in response to the rotation of said turret for pivoting of said leading walls between positions of outward divergence and convergence, a pair of outrigger arms mounted to each of said wall-like members, one on each side of the turret, a belt-like heat transfer member fixed to the free ends of said arms and extending through said pockets forwardly of said wall-like member, and cam control mechanism including cam followers carried by said outrigger arms and fixed cam tracks spaced laterally of and extending circumferentially of said turret in registry with said cam followers for actuation of said outrigger arms between positions maintaining said heat transfer member transversely of said turret to positions wrapping portions of said belt-like members about opposite ends of a packaged article.

References Cited in the file of this patent
UNITED STATES PATENTS

| | | |
|---|---|---|
| 502,637 | Rose | Aug. 1, 1893 |
| 1,313,863 | Smith | Aug. 19, 1919 |
| 1,875,979 | Beutel | Sept. 6, 1932 |
| 1,984,850 | Van Busen | Dec. 18, 1934 |
| 3,035,379 | Cloots | May 22, 1962 |